US012366110B2

(12) United States Patent
Angenend

(10) Patent No.: US 12,366,110 B2
(45) Date of Patent: Jul. 22, 2025

(54) SAFETY GATE

(71) Applicant: WaterFilled Barrier Systems International, Inc., Paige, TX (US)

(72) Inventor: Michael Angenend, Paige, TX (US)

(73) Assignee: WaterFilled Barrier Systems International, Inc., Paige, TX (US)

( * ) Notice: Subject to any disclaimer, the term of this patent is extended or adjusted under 35 U.S.C. 154(b) by 0 days.

(21) Appl. No.: 18/612,712

(22) Filed: Mar. 21, 2024

(65) Prior Publication Data

US 2024/0229549 A1 Jul. 11, 2024

Related U.S. Application Data

(62) Division of application No. 17/533,794, filed on Nov. 23, 2021, now Pat. No. 11,965,379.

(60) Provisional application No. 63/118,326, filed on Nov. 25, 2020.

(51) Int. Cl.

*E06B 9/04* (2006.01)
*E04G 21/32* (2006.01)
*E05B 65/00* (2006.01)
*E06B 9/00* (2006.01)

(52) U.S. Cl.

CPC ............ *E06B 9/04* (2013.01); *E04G 21/3219* (2013.01); *E05B 65/0007* (2013.01); *E05Y 2900/40* (2013.01); *E06B 2009/002* (2013.01)

(58) Field of Classification Search

CPC ..... E06B 9/01; E06B 9/02; E06B 9/04; E06B 11/00; E06B 11/02; E06B 2009/002; E05B 65/0007; E05Y 2900/40; E04G 21/3219; E04G 21/3233

See application file for complete search history.

(56) References Cited

U.S. PATENT DOCUMENTS

| | | | | | |
|---|---|---|---|---|---|
| 429,932 | A * | 6/1890 | Mathews | B66B 13/06 | 187/326 |
| 621,670 | A * | 3/1899 | Hinds | B66B 13/303 | 49/387 |
| 735,306 | A * | 8/1903 | Simpson | B66B 13/06 | 187/331 |
| 1,064,791 | A * | 6/1913 | Underwood | B66B 13/06 | 187/332 |
| 1,321,697 | A * | 11/1919 | Alfano | B66B 13/12 | 160/117 |
| 1,330,843 | A * | 2/1920 | Burke | E06B 9/0676 | 160/117 |
| 2,154,421 | A * | 4/1939 | Cunningham | B66B 13/06 | 160/202 |
| 2,940,790 | A * | 6/1960 | Ingalls | E05B 65/0007 | 49/366 |
| 3,425,165 | A * | 2/1969 | Cleveland | E04G 21/3219 | 52/645 |
| 3,662,993 | A * | 5/1972 | Lionetto | E04G 7/22 | 256/65.13 |

(Continued)

*Primary Examiner* — Justin B Rephann
(74) *Attorney, Agent, or Firm* — K&L Gates LLP

(57) ABSTRACT

A safety gate includes a first column, disposed on a first side of an elevator shaft, a second column, disposed on a second side of the elevator shaft, a first gate panel, and a second gate panel. The first gate panel is coupled to the first column via a first locking hinge. The second gate panel is coupled to the second column via a second locking hinge.

16 Claims, 8 Drawing Sheets

(56) References Cited

U.S. PATENT DOCUMENTS

| | | | | | |
|---|---|---|---|---|---|
| 3,895,460 | A * | 7/1975 | Lubmann | E06B 11/02 | 49/131 |
| 4,041,646 | A * | 8/1977 | Mittag | E06B 11/02 | 182/112 |
| 4,263,749 | A * | 4/1981 | McDougle | E06B 11/02 | 49/237 |
| 4,387,916 | A * | 6/1983 | Lening | E05B 65/0007 | 292/205 |
| 4,592,578 | A * | 6/1986 | Martin | E05B 65/06 | 292/148 |
| 5,016,928 | A * | 5/1991 | Segovia | E05B 65/0007 | 292/213 |
| 5,143,413 | A * | 9/1992 | Vandenhoek | F16B 7/0426 | 292/DIG. 60 |
| 5,394,923 | A * | 3/1995 | Danziger | E05D 15/16 | 160/188 |
| 5,546,703 | A * | 8/1996 | Conway | E06B 11/00 | 49/203 |
| 5,564,238 | A * | 10/1996 | Ellis | B65G 69/008 | 49/447 |
| 5,592,779 | A * | 1/1997 | Conway | E06B 11/00 | 49/73.1 |
| 6,094,863 | A * | 8/2000 | LaCook, Jr. | E06B 11/02 | 49/49 |
| 6,138,812 | A * | 10/2000 | Kimener | E06B 11/00 | 49/133 |
| 7,017,958 | B1 * | 3/2006 | Bowers | E05C 19/08 | 292/281 |
| 7,854,092 | B2 * | 12/2010 | Stoffels | E06B 11/00 | 49/109 |
| 8,794,681 | B2 * | 8/2014 | Crosse | E05B 65/0007 | 292/189 |
| 10,519,014 | B2 * | 12/2019 | Conway | B66F 11/04 | |
| 2005/0005522 | A1 * | 1/2005 | Benko | E06B 11/00 | 49/50 |
| 2008/0216408 | A1 * | 9/2008 | Letkeman | E05D 15/264 | 49/340 |
| 2009/0217591 | A1 * | 9/2009 | LaCook | E04G 5/144 | 49/50 |
| 2014/0259939 | A1 * | 9/2014 | Collinson | E05F 15/63 | 49/340 |
| 2017/0328075 | A1 * | 11/2017 | Conners | B64F 5/40 | |
| 2020/0173190 | A1 * | 6/2020 | Galla | E04H 17/05 | |
| 2020/0208361 | A1 * | 7/2020 | Stover | E06B 11/02 | |
| 2020/0325755 | A1 * | 10/2020 | Craig | E06B 11/02 | |

* cited by examiner

SAFETY GATE

PRIORITY CLAIM AND CROSS-REFERENCE TO RELATED APPLICATIONS

The present application is a divisional of U.S. patent application Ser. No. 17/533,794, filed Nov. 23, 2021, entitled SAFETY GATE, which claims priority to U.S. Provisional Patent Application No. 63/118,326, filed Nov. 25, 2020, entitled SAFETY GATE, the entire contents of which are incorporated by reference here and relied upon.

FIELD

The present disclosure relates generally to systems for safety improvement and fall-avoidance with customizable safety gates.

BACKGROUND

As can be expected, in typical construction projects there is often a certain degree of unfinished work. Namely, as construction personnel are working on one aspect or portion of a building, other aspects or portions are in a pending or yet to be completed state. Some specific examples include elevators, elevator shafts, balconies, and other multi-level features. With elevators, for example, the elevator shaft is constructed early in the build process; the elevator and doors are installed (into the elevator shaft) much later in the build process. Thus, there is a portion of time where elevator shafts are exposed. This presents a substantial risk of injury to those working on and in the building.

The typical solution to reducing this risk of injury, namely falling into the exposed elevator shaft, involves the temporary construction of wooden barriers. More specifically, construction personnel will fasten wooden boards directly into the walls (on either side of the elevator shaft) to build a temporary barrier across the shaft. This barrier is intended to reduce the risk of falling into the shaft. Undesirably, however, these wooden boards are fastened or bolted directly to the concrete wall. Once fastened, it is difficult to "open" the wooden boards and access the shaft; rather, the wooden boards are semi-permanent and have to be removed to access the shaft. Once removed, wooden boards would need to be re-installed to function as a protective barrier. Further, though these boards are semi-permanent, they are not easily reusable from job-to-job or from location-to-location at a particular job site. In other words, once removed, wooden boards are often disposed of and new boards are used at the new location. This leads to undesirable waste. The wooden boards also require daily physical inspection by trained personnel; time-consuming inspection is wasteful, from both a timing and cost perspective. Lastly, wooden boards do not provide sufficient structural rigidity to serve additional purposes beyond their role as a temporary protective measure.

Improved safety gates, providing efficient installation, application-specific flexibility, and added use cases, are therefore needed.

SUMMARY

The safety gates and related systems disclosed herein improve on current safety gate technology, fastening both to structural columns and to other gates, providing easy-to-open and close features that allow for both locked and pivoting configurations, and providing for improved rigidity resulting in added safety features among other added benefits.

In light of the disclosure, and without limiting the scope of the invention in any way, in a first aspect of the present disclosure, which may be combined with any other aspect listed herein unless specified otherwise, a safety gate includes a first column, disposed on a first side of an elevator shaft, a second column, disposed on a second side of the elevator shaft, a first gate panel, and a second gate panel. The first gate panel is coupled to the first column via a first locking hinge. The second gate panel is coupled to the second column via a second locking hinge.

In a second aspect of the present disclosure, which may be combined with any other aspect listed herein unless specified otherwise, the safety gate further includes a central lock insert, such that the first gate panel is coupled to the second gate panel via the central lock insert.

In a third aspect of the present disclosure, which may be combined with any other aspect listed herein unless specified otherwise, the central lock insert includes a first protrusion and a second protrusion.

In a fourth aspect of the present disclosure, which may be combined with any other aspect listed herein unless specified otherwise, the first protrusion and the second protrusion are parallel.

In a fifth aspect of the present disclosure, which may be combined with any other aspect listed herein unless specified otherwise, the first protrusion includes a first proximal portion having a square cross-section and a first distal portion having a circular cross-section.

In a sixth aspect of the present disclosure, which may be combined with any other aspect listed herein unless specified otherwise, the first column is configured to be coupled to one of a wall and a floor. Further, the second column is configured to be coupled to one of a wall and a floor.

In a seventh aspect of the present disclosure, which may be combined with any other aspect listed herein unless specified otherwise, an additional gate panel is disposed between the first gate panel and the second gate panel.

In an eighth aspect of the present disclosure, which may be combined with any other aspect listed herein unless specified otherwise, the safety gate further includes a gate latch. The gate latch is disposed along a portion of the first gate panel and disposed along a portion of the second gate panel. The gate latch has a U-shaped cross section.

In a ninth aspect of the present disclosure, which may be combined with any other aspect listed herein unless specified otherwise, the safety gate further includes a kick plate. The kick plate is pivotably coupled to the first gate panel.

In a tenth aspect of the present disclosure, which may be combined with any other aspect listed herein unless specified otherwise, the kick plate is configured to pivot from a first position disposed entirely along the first gate panel to a second position, such that the kick plate is coupled to the second gate panel.

In an eleventh aspect of the present disclosure, which may be combined with any other aspect listed herein unless specified otherwise, the safety gate further includes a toe board plug. The toe board plug is disposed between the first gate panel and the second gate panel. The toe board plug is configured to receive proximal portions of a central lock insert.

In a twelfth aspect of the present disclosure, which may be combined with any other aspect listed herein unless specified otherwise, the first column includes a first column insert, disposed within apertures at the first column. The second column includes a second column insert, disposed within apertures at the second column. Each of the first column insert and the second column insert extend vertically from a top of the respective first column and second column.

In a thirteenth aspect of the present disclosure, which may be combined with any other aspect listed herein unless specified otherwise, a support rod is coupled to each of the first column insert and the second column insert.

In a fourteenth aspect of the present disclosure, which may be combined with any other aspect listed herein unless specified otherwise, a net is hung from the support rod.

In a fifteenth aspect of the present disclosure, which may be combined with any other aspect listed herein unless specified otherwise, a cable is coupled to each of the first column insert and the second column insert.

In a sixteenth aspect of the present disclosure, which may be combined with any other aspect listed herein unless specified otherwise, a method of installing a safety gate includes affixing a first column to a first wall and a floor. The first column is disposed on a first side of an elevator shaft. The method includes affixing a second column to a second wall and the floor. The second column is disposed on a second side of the elevator shaft. The method includes coupling a first gate panel to the first column via a first locking hinge and coupling a second gate panel to the second column via a second locking hinge. The method includes disposing a first column insert within apertures at the first column and disposing a second column insert within apertures at the second column. The method includes coupling a support rod to each of the first column insert and the second column insert.

In a seventeenth aspect of the present disclosure, which may be combined with any other aspect listed herein unless specified otherwise, the method further includes uncoupling the first gate panel from the first column, such that the first gate panel is pivotable about the second gate panel.

In an eighteenth aspect of the present disclosure, which may be combined with any other aspect listed herein unless specified otherwise, the method further includes hanging a net from the support rod.

In a nineteenth aspect of the present disclosure, which may be combined with any other aspect listed herein unless specified otherwise, the method further includes disposing a gate latch along a portion of the first gate panel and along a portion of the second gate panel. The gate latch has a U-shaped cross section.

In a twentieth aspect of the present disclosure, which may be combined with any other aspect listed herein unless specified otherwise, the method further includes pivoting a kick plate from a first position disposed entirely along the first gate panel to a second position, such that the kick plate is coupled to the second gate panel.

In a twenty-first aspect of the present disclosure, which may be combined with any other aspect listed herein unless specified otherwise, a method of installing a safety gate, including: affixing a first column to a first wall and a floor, where the first column is disposed on a first side of an elevator shaft; affixing a second column to a second wall and the floor, where the second column is disposed on a second side of the elevator shaft; coupling a first gate panel to the first column via a first locking hinge; coupling a second gate panel to the second column via a second locking hinge; disposing a first column insert within apertures at the first column; disposing a second column insert within apertures at the second column; and coupling a support rod to each of the first column insert and the second column insert.

In a twenty-second aspect of the present disclosure, which may be combined with any other aspect listed herein unless specified otherwise, further including uncoupling the first gate panel from the first column, such that the first gate panel is pivotable about the second gate panel.

In a twenty-third aspect of the present disclosure, which may be combined with any other aspect listed herein unless specified otherwise, further including hanging a net from the support rod.

In a twenty-fourth aspect of the present disclosure, which may be combined with any other aspect listed herein unless specified otherwise, further including disposing a gate latch along a portion of the first gate panel and along a portion of the second gate panel and the gate latch has a U-shaped cross section.

In a twenty-fifth aspect of the present disclosure, which may be combined with any other aspect listed herein unless specified otherwise, further including pivoting a kick plate from a first position disposed entirely along the first gate panel to a second position, such that the kick plate is coupled to the second gate panel.

In a twenty-sixth aspect of the present disclosure, which may be combined with any other aspect listed herein unless specified otherwise, the first column includes a steel frame construction.

In a twenty-seventh aspect of the present disclosure, which may be combined with any other aspect listed herein unless specified otherwise, the second column includes a steel frame construction.

In a twenty-eight aspect of the present disclosure, which may be combined with any other aspect listed herein unless specified otherwise, further including hanging a curtain from the support rod.

In a twenty-ninth aspect of the present disclosure, which may be combined with any other aspect listed herein unless specified otherwise, method of installing a safety gate, including: affixing a first column to a first side of an elevator shaft; affixing a second column to a second side of the elevator shaft; coupling a first rectangular gate panel to the first column; coupling a second rectangular gate panel to the second column; and coupling the first rectangular gate panel to the second rectangular gate panel via a central lock insert. The central lock insert is U-shaped and includes a first protrusion and a second protrusion. The first protrusion and the second protrusion are parallel. The first protrusion includes a first proximal portion having a square cross-section and a first distal portion having a circular cross-section and the second protrusion includes a second proximal portion having a square cross-section and a second distal portion having a circular cross-section. The first protrusion engages with a flange of the first rectangular gate panel, and the second protrusion engages with a flange of the second rectangular gate panel, such that the first protrusion and the second protrusion are disposed vertically between the first rectangular gate panel and the second rectangular gate panel. The first rectangular gate panel is coupled to the first column via a first locking hinge, and the second rectangular gate panel is coupled to the second column via a second locking hinge.

In a thirtieth aspect of the present disclosure, which may be combined with any other aspect listed herein unless specified otherwise, the first column is configured to be coupled to one of a wall and a floor, and the second column is configured to be coupled to one of a wall and a floor.

In a thirty-first aspect of the present disclosure, which may be combined with any other aspect listed herein unless specified otherwise, further including disposing a gate latch along a portion of the first rectangular gate panel and along a portion of the second rectangular gate panel and the gate latch has a U-shaped cross section.

In a thirty-second aspect of the present disclosure, which may be combined with any other aspect listed herein unless specified otherwise, further including coupling a kick plate pivotably to the first rectangular gate panel.

In a thirty-third aspect of the present disclosure, which may be combined with any other aspect listed herein unless specified otherwise, the kick plate is configured to pivot from a first position disposed entirely along the first rectangular gate panel to a second position, such that the kick plate is coupled to the second rectangular gate panel.

In a thirty-fourth aspect of the present disclosure, which may be combined with any other aspect listed herein unless specified otherwise, further including disposing a toe board plug between the first rectangular gate panel and the second rectangular gate panel, and the toe board plug is configured to receive proximal portions of a central lock insert.

In a thirty-fifth aspect of the present disclosure, which may be combined with any other aspect listed herein unless specified otherwise, the first column includes a first column insert, disposed within apertures at the first column, and the second column includes a second column insert, disposed within apertures at the second column. Each of the first column insert and the second column insert extend vertically from a top of the respective first column and second column.

In a thirty-sixth aspect of the present disclosure, which may be combined with any other aspect listed herein unless specified otherwise, a support rod is coupled to each of the first column insert and the second column insert.

In a thirty-seventh aspect of the present disclosure, which may be combined with any other aspect listed herein unless specified otherwise, a cable is coupled to each of the first column insert and the second column insert.

In a thirty-eight aspect of the present disclosure, which may be combined with any other aspect listed herein unless specified otherwise, the first column includes a steel frame construction.

In a thirty-ninth aspect of the present disclosure, which may be combined with any other aspect listed herein unless specified otherwise, the second column includes a steel frame construction.

In a fortieth aspect of the present disclosure, which may be combined with any other aspect listed herein unless specified otherwise, further including hanging one of a net or a curtain from the support rod.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Figure 1:
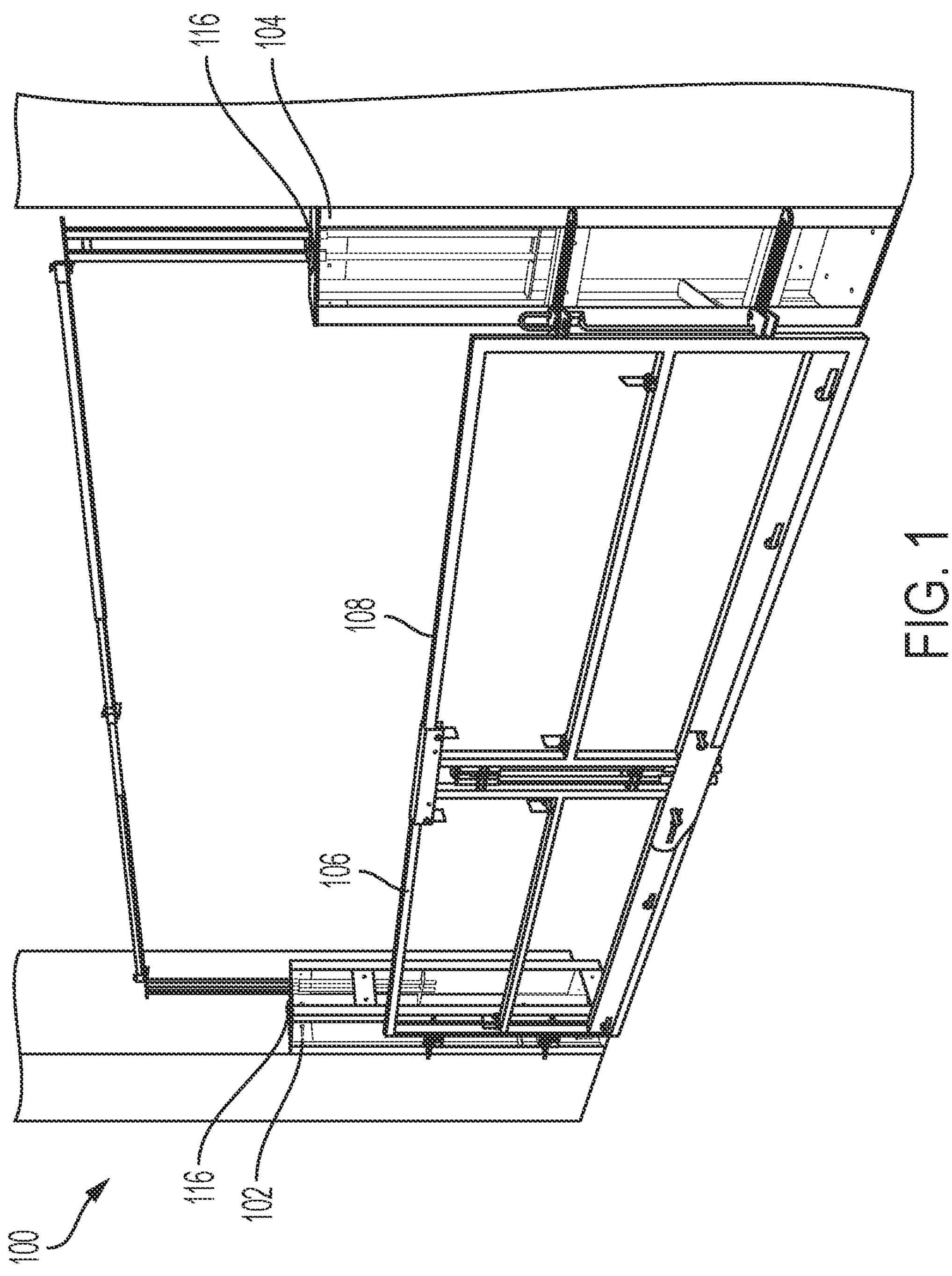
FIG. 1 illustrates an installed safety gate, according to an example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specific the presence of stated features, integers, steps, operations, elements, and/or components, but do not preclude the presence or additional of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent"). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

With reference to FIG. 1, a safety gate 100 is configured to extend across a gap between columns or, alternatively to cover a gap or hole in a wall. It should be appreciated that the safety gate 100 can be implemented in a number of construction-specific applications. As illustrated in FIG. 1, the safety gate 100 extends across an entry to an elevator shaft. Because an elevator has not yet been installed into this elevator shaft, the elevator shaft is “open” and presents a fall risk; this safety gate 100 reduces risk of injury, such as falls, into the elevator shaft.

The safety gate 100 includes a first column 102 and a second column 104. The safety gate 100 further includes a first gate panel 106 and a second gate panel 108, generally disposed between the first column 102 and second column 104. As illustrated in FIG. 1, first gate panel 106 and second gate panel 108 are depicted as frames; it should be appreciated that each of first gate panel 106 and second gate panel 108 would include additional material (e.g., solid material, chain link, netting, or the like) across their surfaces so as to prevent anything from passing through a plane defined by each of the first gate panel 106 and the second gate panel 108.

The first column 102 and second column 104 are disposed in vertical configurations. In an embodiment, each of the first column 102 and second column 104 include steel frame construction. It should be appreciated, however, that other materials for constructing first column 102 and second column 104 are contemplated herein.

Figure 2A:
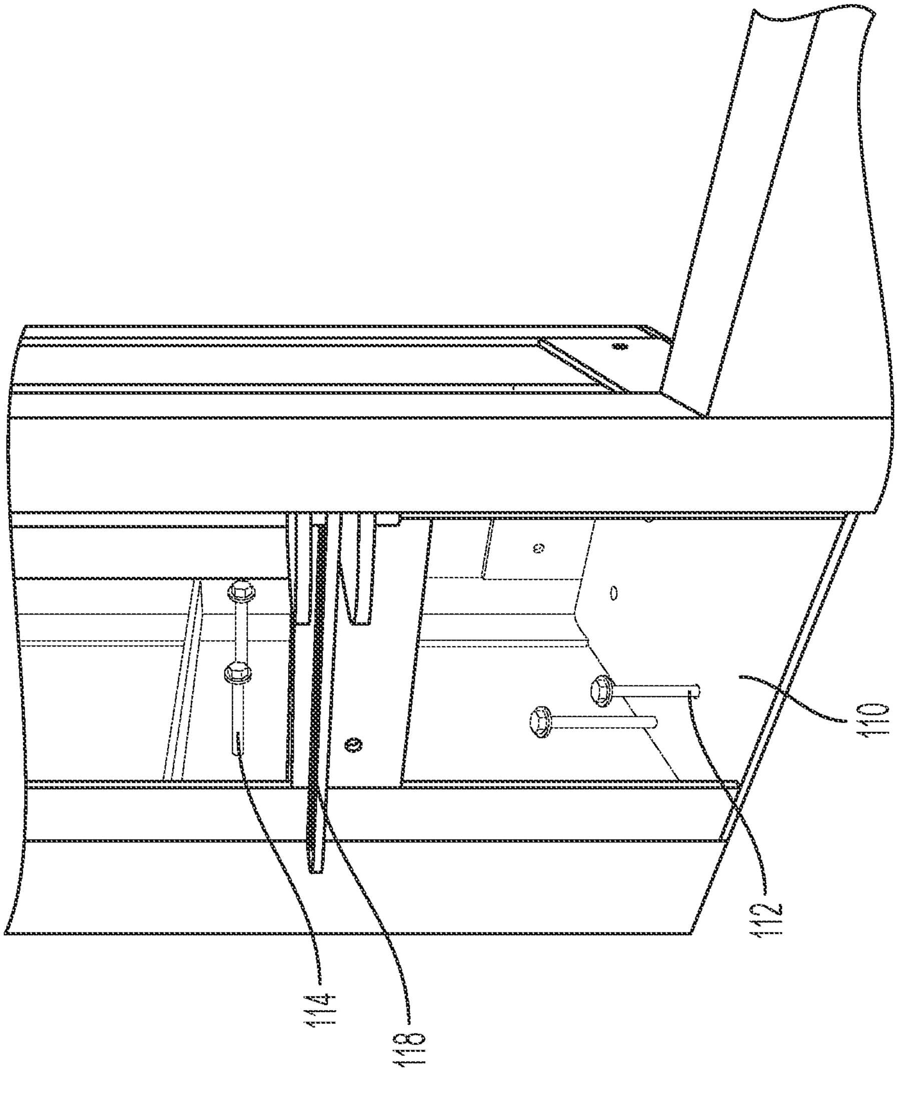
FIGS. 2A to 2G illustrate particular steps regarding the installation of the safety gate, along with particular features of the safety gate depicted in FIG. 1.

The first and second columns 102, 104 are generally vertical support structures, disposed on the ends of the safety gate 100. First column is affixed to a building column, building wall, or building floor on a first side of an elevator shaft. Similarly, second column 104 is affixed to a building column, building wall, or building floor on a second side of the elevator shaft. Specifically, as illustrated by FIG. 2A, each column includes a flat base 110, which provides a level surface for mating with the building floor. Each column includes a plurality of anchor bolts. A first set of anchor bolts 112 couple the first column 102 to the building floor. Furthermore, a second set of anchor bolts 114 couple the first column 102 to the building wall, such as an unfinished concrete wall surface.

It should be appreciated that second column 104 includes similar features for installation. Namely, a first set of anchor bolts 112 couple the second column 104 to the building floor and a second set of anchor bolts 114 couple the second column 104 to the building wall. Furthermore, in an embodiment, each of the first column 102 and the second column 104 include one or more anchoring rings 116, disposed at the top of the respective columns. Anchoring rings may be used, for example, as an anchor point for safety equipment when personnel are working near the gate and/or elevator shaft. Specifically, personnel may anchor a safety line, coupled to a harness, to the anchor point as for an added level of protection. Anchoring rings may further be used as a lift point to lift, move, and transport the columns to a given location (e.g., up an elevator shaft to a desired floor, prior to installation).

Figure 2B:
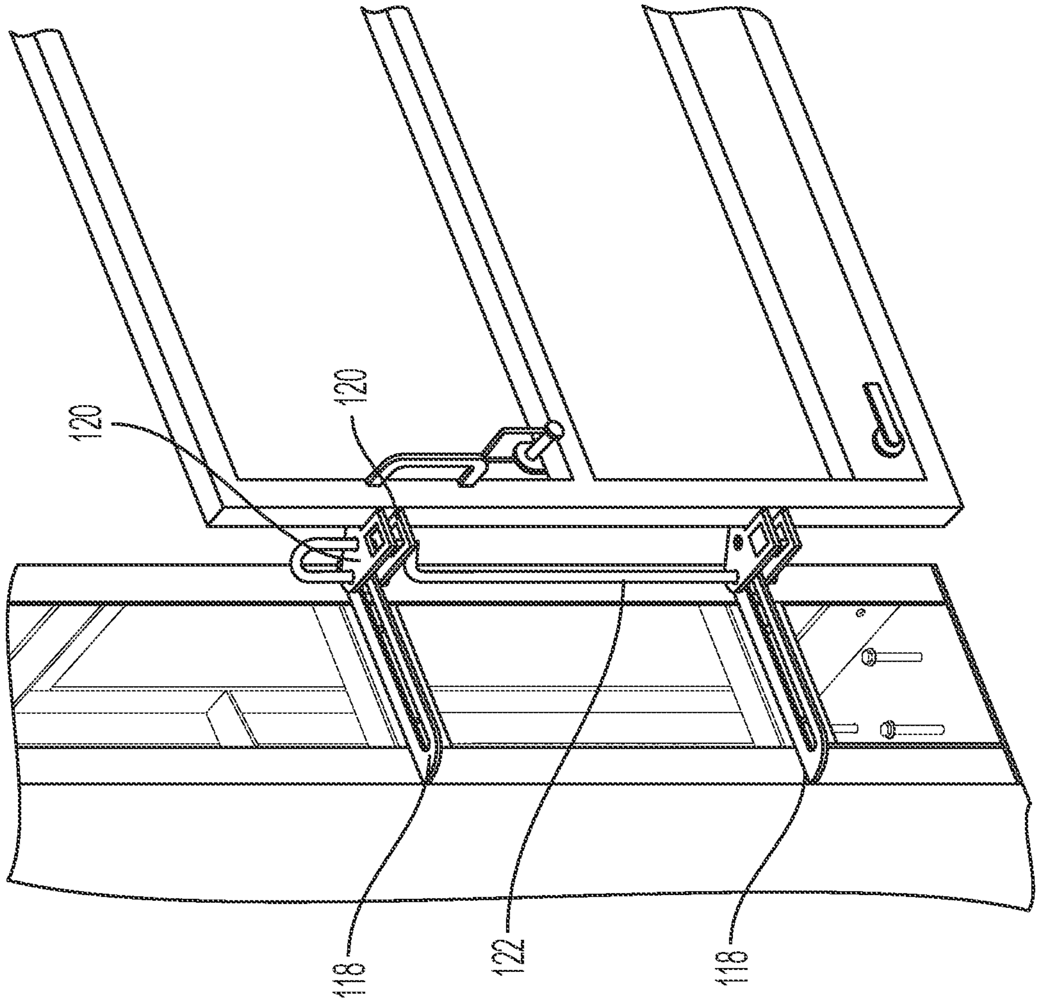

As illustrated in FIG. 2B, for example, each of the first column 102 and the second column 104 include one or more column flanges 118, each having a plane that is generally parallel with the flat base 110. Similarly, each gate panel includes one or more top and bottom flanges 120, each having planes that are generally parallel with the floor. When the top and bottom flanges 120 are aligned with the column flange 118, a rotatable rod 122 is configured to be disposed through the three flanges 118, 120. The rotatable rod 122 may be generally categorized as a locking hinge. Namely, when the rotatable rod 122 engages with the flanges of both the column and the gate panel (i.e., engaged with all three flanges), the column 102 and the gate panel 106 are coupled to one another; when the rotatable rod 122 is disengaged from the flanges of the column and gate panel (i.e., disengaged from all three flanges), the column 102 and the gate panel 106 are no longer coupled to one another. Importantly, when the rotatable rod 122 engages with the flanges of both the column and the gate panel, the gate is pivotable about the rotatable rod 122, such that the gate panel 106 is generally pivotable about the column 102.

While the discussion above, particularly with reference to FIGS. 2A to 2B discusses a first column 102 and a first gate panel 106, it should be appreciated that a second column 104 and second gate panel 108 operate in similar ways as described above and include similar structural components.

Figure 2C:
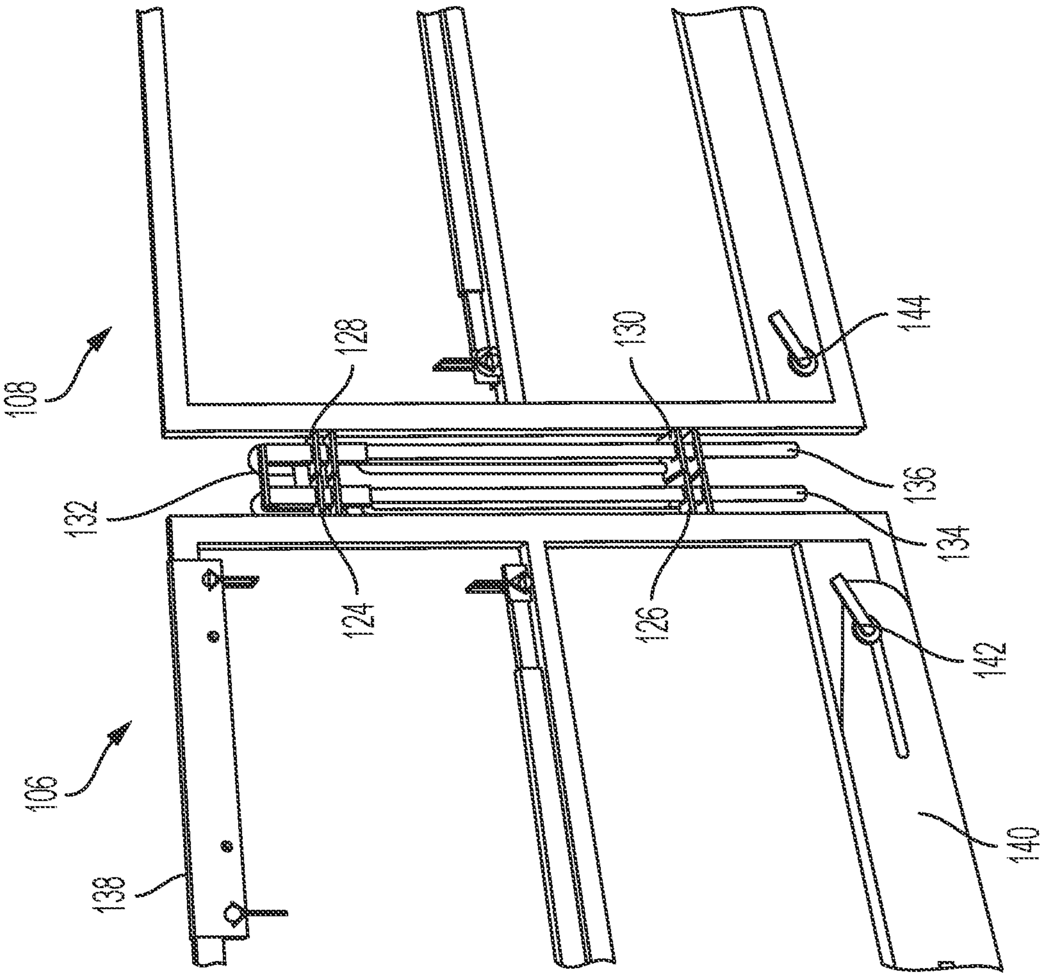

Furthermore, as illustrated by FIG. 2C, each of the first gate panel 106 and the second gate panel 108 are configured to be coupled to each other. Namely, each of the first gate panel 106 and the second gate panel 108 include central flanges. Specifically, the first gate panel 106 includes a top central flange 124 and a bottom central flange 126; the second gate panel 108 includes a top central flange 128 and a bottom central flange 130.

The safety gate 100 further includes a central lock insert 132, which is configured to engage with the flanges of the first gate panel 106 and the second gate panel 108. For example, the central lock insert 132 may be a generally U-shaped bracket, having a lateral component and two protrusions 134, 136. Each of the two protrusions 134, 136 extend in a perpendicular direction, away from lateral component. For example, first protrusion 134 and second protrusion 136 are parallel to one another. Each of the first protrusion 134 and the second protrusion 136 further include varying cross-sections along the lengths of the individual protrusions. Specifically, the first protrusion 134 includes a proximal portion, having a square cross-section and a distal portion having a circular cross-section. Similarly, the second protrusion 136 includes a proximal portion, having a square cross-section and a distal portion having a circular cross-section. While the proximal portions discussed herein have square cross-sections, it should be appreciated that, in alternate embodiments, the proximal portions may include other non-circular cross-sections, such as rectangular cross sections.

As illustrated in FIG. 2C, central lock insert 132 is generally configured to couple the first gate panel 106 and the second gate panel 108 to one another. For example, the central lock insert 132 is inserted downward, into the first gate panel 106 and the second gate panel 108, such that the first protrusion 134 extends through top central flange 124 and bottom central flange 126 of the first gate panel 106 and the second protrusion 136 extends through the top central flange 128 and bottom central flange 130 of the second gate panel 108. Thus, when central lock insert 132 is inserted into the various flanges, the first gate panel 106 is coupled to the second gate panel 108.

Moreover, given the protrusions of central lock insert 132, each of the first gate panel 106 and the second gate panel 108 are selectively pivotable about one another. In other words, when the central lock insert 132 is partially removed from the first gate panel 106 and the second gate panel 108, the proximal portions (having the square cross-sections) are disengaged from the respective gate panels; at the same time, the distal portions (having the circular cross-sections) remain engaged with the respective gate panels. In this particular configuration, given the gate panels are only engaged with circular portions of the central lock insert 132, the gate panels are pivotable about the central lock insert 132. For example, the first gate panel 106 is pivotable about the central lock insert, such that the first gate panel 106 is generally pivotable about the second gate panel 108. It should be appreciated that, in order for first gate panel 106 to be pivotable about the second gate panel 108, the rotatable rod 122 associated with the first gate panel 106 must be disengaged from the first column 102.

Similarly, the safety gate 100 can generally be “opened” by removal of the central lock insert 132. For example, responsive to fully removing the central lock insert 132, the first gate panel 106 is pivotable about the first rotatable rod 122, such that the first gate panel 106 is generally pivotable about the first column 102; similarly, the second gate panel 108 is pivotable about the second rotatable rod, such that the second gate panel 108 is generally pivotable about the second column 104. Thus, both gate panels can be “unlocked” and the entire safety gate 100 can swing “open” for access to the elevator shaft.

Figure 2D:
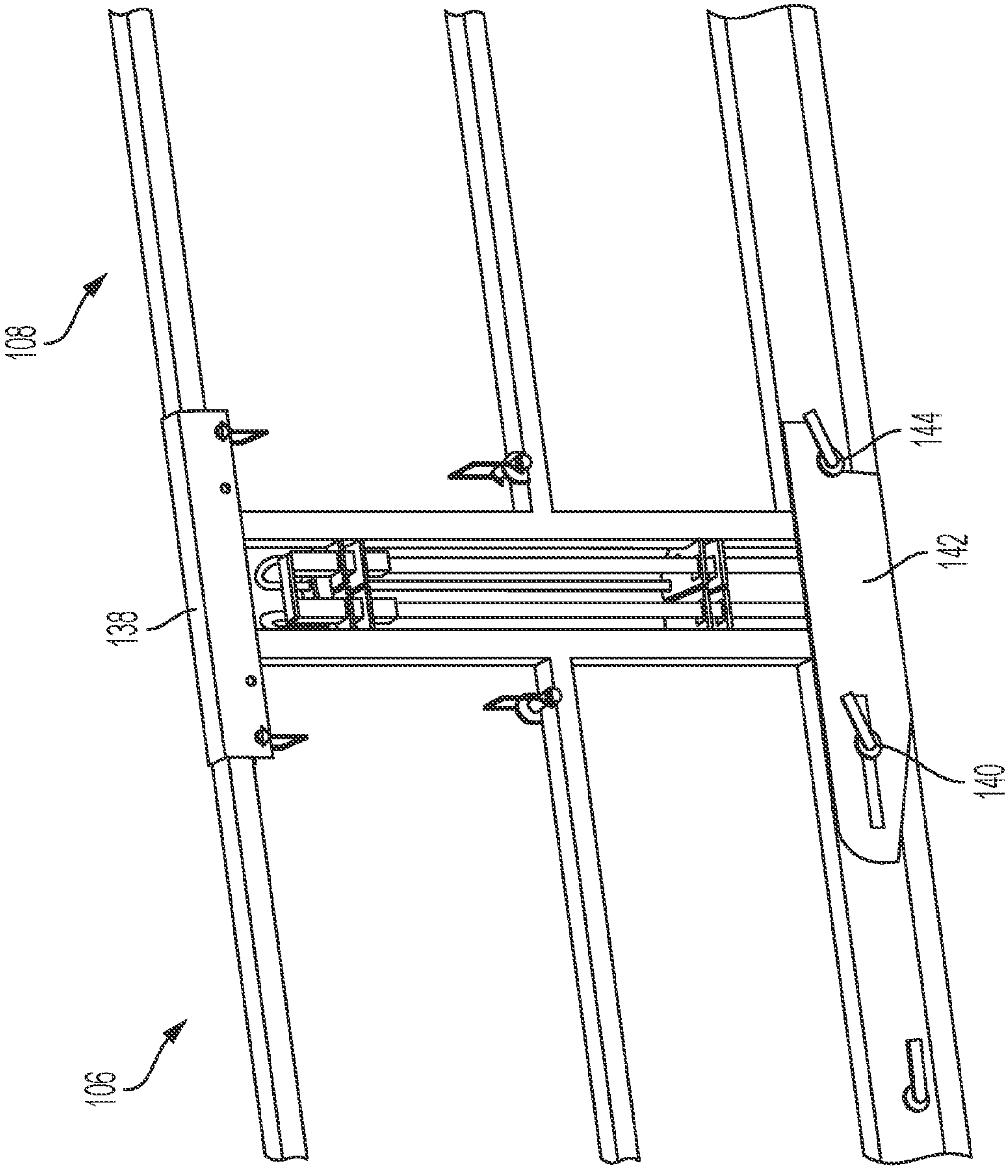

Returning to FIG. 2C, the safety gate 100 may further include a gate latch 138. For example, gate latch 138 may be initially stored along a top portion of the first gate panel 106. Gate latch 138 has a U-shaped cross-section, configured to mate with the top portion of the gate panels. Gate latch 138 may be coupled to the top portion of first gate panel 106 with one or more removable pins or other related latches. While FIG. 2C illustrates a stored configuration for the gate latch 138, FIG. 2D illustrates the gate latch 138 in a locked configuration. Namely, when in a locked configuration, the gate latch 138 is disposed along a top portion of the first gate panel 106 and a top portion of the second gate panel 108 simultaneously. A removable pin extends through the gate latch 138 at each of the first gate panel 106 and the second gate panel 108, such that the gate latch 138 is affixed between the two gate panels 106, 108 and cannot slide off of either gate panel. In the locked configuration, the gate latch 138 is configured to provide rigidity of the entire safety gate 100, such that neither the first gate panel 106 nor the second gate panel 108 can be opened.

Returning again to FIG. 2C, the safety gate 100 may further include a kick plate 140. For example, kick plate 140 may be pivotally coupled to a bottom portion of the first gate panel 106 at a rotation lock 142. Kick plate 140 is a generally rectangular plate with one or more beveled or chamfered corners. When rotation lock 142 is tightened, kick plate 140 is fixed relative to first gate panel 106. When rotation lock 142 is loosened, however, kick plate 140 is rotatable relative to first gate panel 106 (e.g., rotatable about the rotation lock 142). While FIG. 2C illustrates a stored configuration for the kick plate 140, FIG. 2D illustrates the kick plate 140 in a locked configuration. Namely, when in a locked configuration, the kick plate 140 is rotated and disposed across the second gate panel 108, such that a distal end of the kick plate 140 engages with a rotation lock 144 on the second gate panel 108. The rotation locks 142, 144 can then be tightened, such that kick plate 140 is fixed relative to each of the first gate panel 106 and the second gate panel 108. In the locked configuration, the kick plate 140 is configured to provide rigidity of the entire safety gate 100, such that neither the first gate panel 106 nor the second gate panel 108 can be opened. In an embodiment, kick plate 140 seals a gap between a bottom of the first gate panel 106 and the bottom of the second gate panel 108.

While kick plate 140 is illustrated as being initially disposed on the first gate panel 106, and configured to engage with the second gate panel 108, it should be appreciated that in alternate embodiments kick plate 140 is initially disposed on second gate panel 108 and is configured to engage with the first gate panel 106.

Similar to the central lock insert 132 discussed above with respect to FIG. 2C, each of the columns includes a column insert 146. For example, with reference to FIG. 2E, the first column 102 includes a column insert 146, disposed within apertures on the top side of the first column 102. Though not illustrated by FIG. 2E, it should be appreciated that the second column 104, similarly, includes a column insert. These column inserts extend vertically from the tops of the respective columns. The column insert 146 (similar to central lock insert 132 above) is a generally U-shaped bracket, having lateral components and two protrusions. Each of the two protrusions extend in a perpendicular direction, away from a middle-lateral component 148. For example, first protrusion and second protrusion are parallel to one another. Each of the first protrusion and the second protrusion have a circular cross-section extending downward from the middle-lateral component 148; each of the first protrusion and the second protrusion have a square cross-section extending upward from the middle-lateral component 148.

Figure 2E:
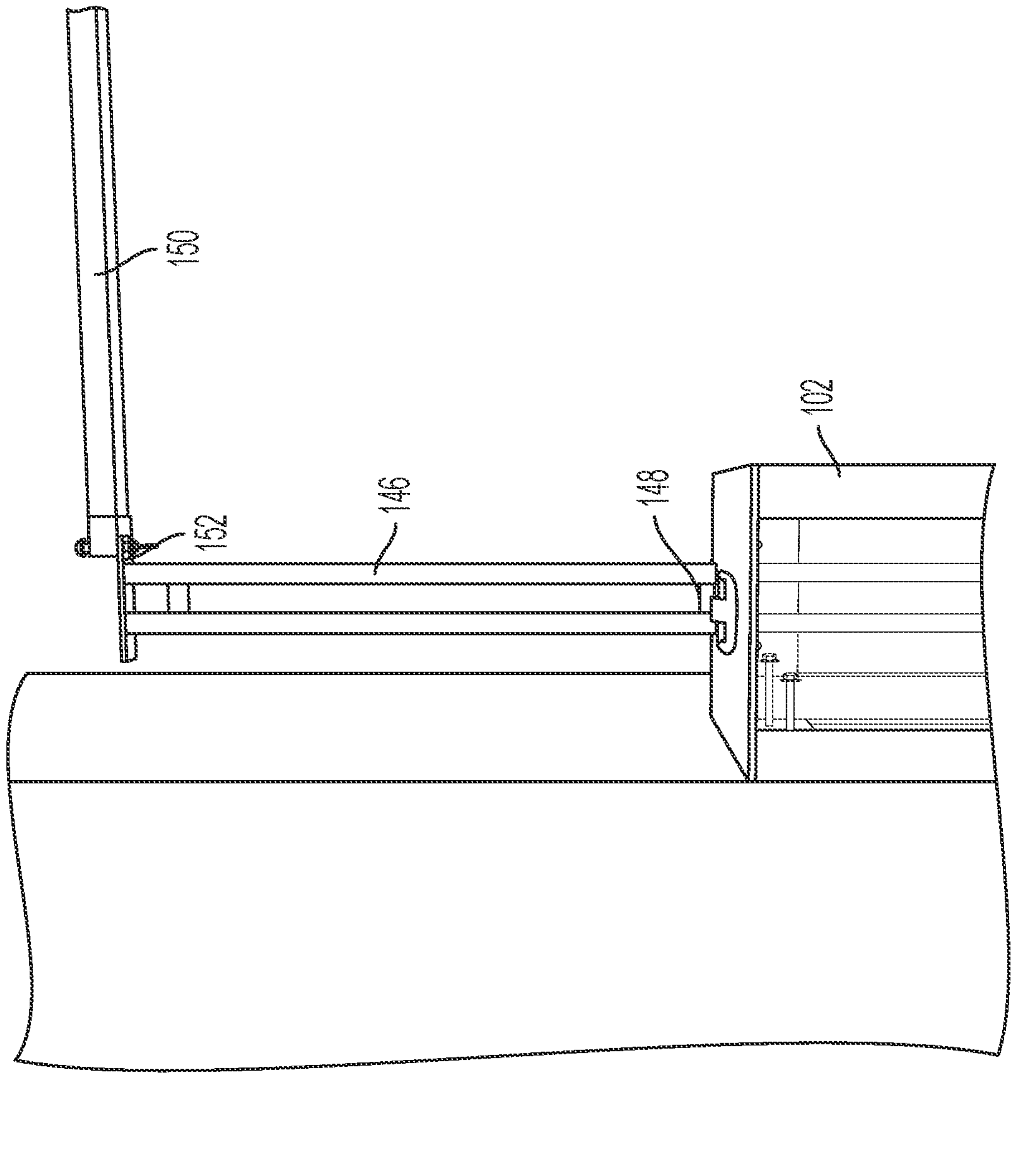

A support rod 150 is coupled to the top of the column insert 146. As illustrated by FIG. 2E, the support rod 150 includes an aperture, configured to mate with an aperture along a flange 152 at the top of the column insert 146. A removable pin is insertable through these apertures, to couple the support rod 150 to the top of the column insert 146. It should be appreciated that a similar coupling is contemplated with the second column 104 and its column insert (not illustrated).

Figure 2F:
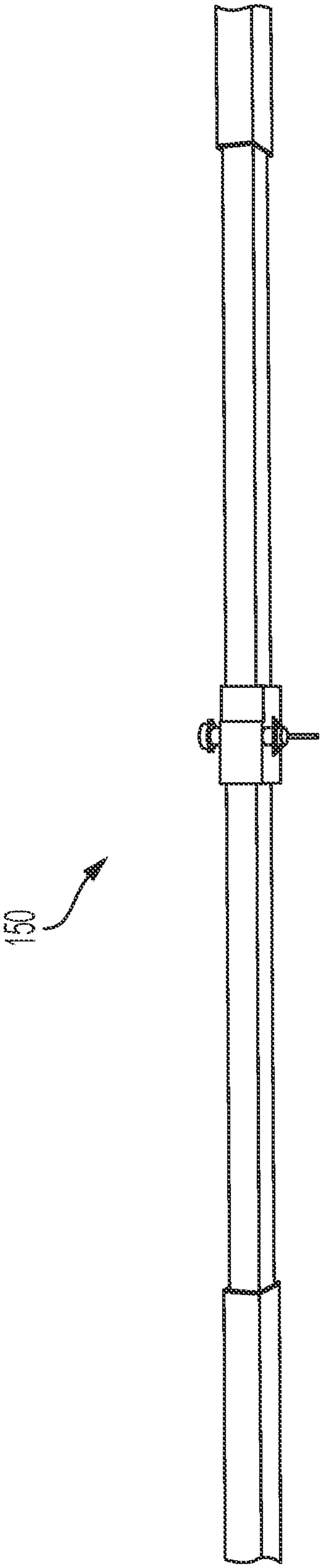

In an embodiment, as illustrated by FIG. 2F, the support rod 150 is telescoping such that the total length of the support rod 150 is adjustable. In another embodiment, the support rod 150 is composed of two separate rods, extending from each of the column inserts 146 at the first column 102 and the second column 104; these two support rods are configured to be coupled together via a central coupling bracket and related removable pin. In an embodiment, a net or curtain is hung from the support rod. For example, a net may further prevent inadvertent entry (e.g., flying debris) into the elevator shaft such as over the top of one of the gate panels 106, 108.

Support rod 150 may be advantageously stored on the gate panels 106, 108 during shipping and prior to assembly. For example, FIG. 2C illustrates that each of first gate panel 106 and second gate panel 108 include central removable pins with related brackets disposed along a center bar of each gate panel 106, 108. Each component of support rod 150 is advantageously coupled to a respective center bar of the gate panel.

In an alternate embodiment, support rod 150 is replaced with a cable (e.g., aircraft cable) affixed to the top of the column inserts at each of the first column 102 and second column 104; in this alternate embodiment, a net or curtain is hung from the cable.

Figure 2G:
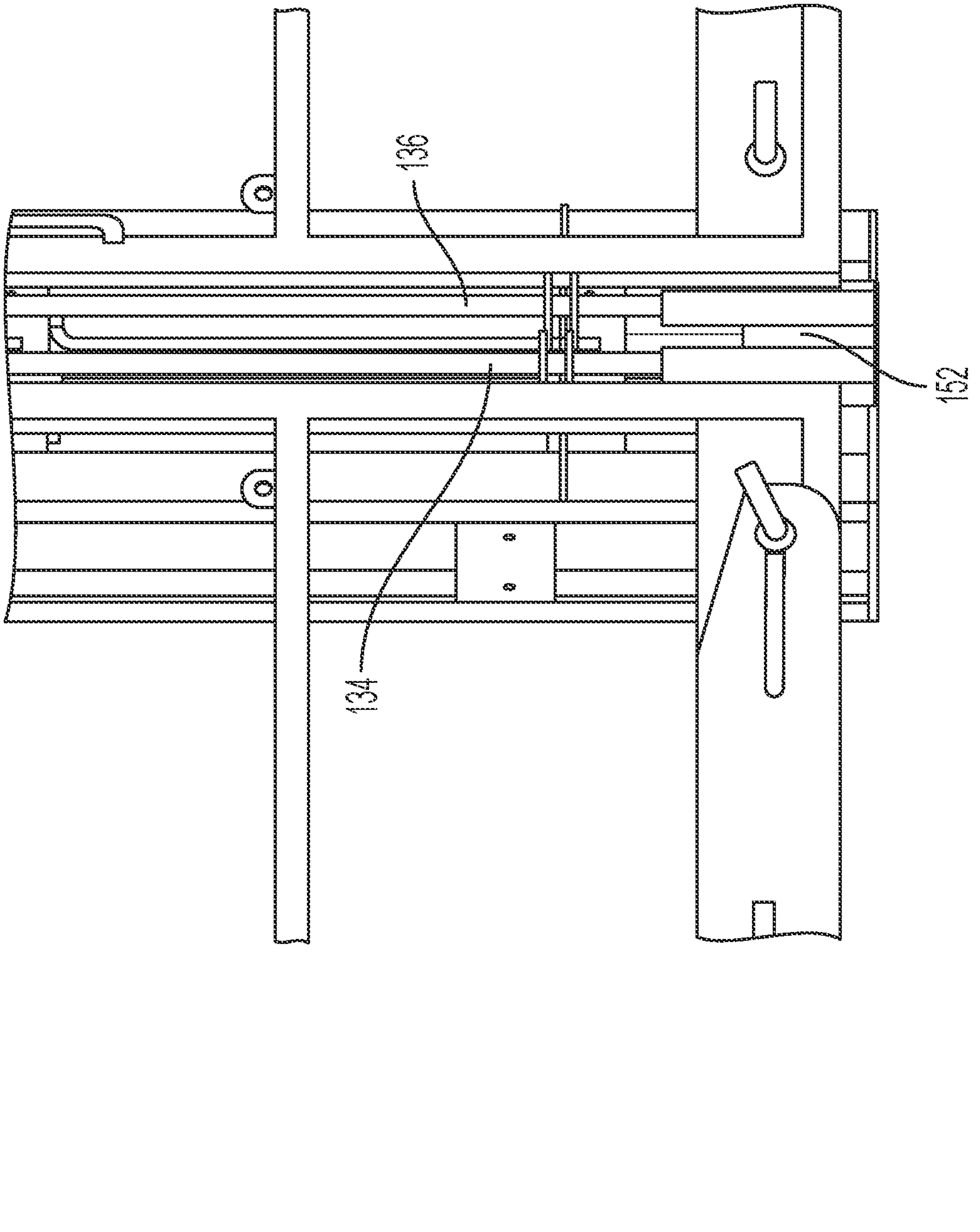

Turning now to FIG. 2G, the safety gate 100 may further include a toe board plug 152. For example, toe board plug 152 may be disposed between the first gate panel 106 and the second gate panel 108. Toe board plug 152 is generally configured to receive proximal portions of the central lock insert 132. For example, toe board plug may include two cylindrical apertures, configured for receiving each of the two protrusions 134, 136 of central lock insert 132. Toe board plug 152 is configured to provide rigidity of the entire safety gate 100, such that neither the first gate panel 106 nor the second gate panel 108 can be opened. In an embodiment, toe board plug 152 seals a gap between a bottom of the first gate panel 106 and the bottom of the second gate panel 108.

As noted generally herein, each of the first gate panel 106 and the second gate panel 108 may be configured as pivotable about a column (e.g., via a rotatable rod) or about another gate panel (e.g., via the central lock insert). In a specific example, first gate panel 106 is pivotable about first column 102; in a different specific example, first gate panel 106 is uncoupled from the first column 102, such that first gate panel 106 is pivotable about second gate panel 108.

It should also be appreciated that each gate panel may be configured as non-pivotable, or locked, about the column or about another gate panel. Namely, for example, first gate panel 106 may be unlocked, such that it pivots about first column 102 via a rotatable rod. Once "opened," however, first gate panel 106 may be locked, such that it is prevented from pivoting about first column 102 in either direction (e.g., prevented from opening further and prevented from returning to its closed position). By configuring gate panels as "lockable" in an open position, each gate panel may perform additional functions. For example, a gate panel may be locked in an open position, to provide access to an elevator shaft while simultaneously blocking a side hallway to the elevator area.

In an embodiment one or more of the first column 102 and second column 104 include a cutout, or other structural feature, for receiving the central lock insert 132. For example, when the central lock insert is removed between first gate panel 106 and second gate panel 108, the central lock insert is insertable into the first column 102 for temporary storage.

While the safety gate 100 disclosed above generally includes two gate panels, it should be appreciated that more than two gate panels are contemplated herein. For example, a three-panel safety gate may include a first column and a second column, with three gate panels: a first gate panel, a second gate panel, and a third gate panel. The three-panel safety gate may further include a first central lock insert and a second central lock insert. For example, with the three-panel safety gate, the first gate panel is generally pivotable about the first column. The first gate panel is coupled to the second gate panel via the first central lock insert. The second gate panel is coupled to the third gate panel via the second central lock insert. Lastly, the third gate panel is generally pivotable about the second column.

In the three-panel safety gate embodiment disclosed, it should be appreciated that any of the three gate panels is "unlockable," such that it may pivot about either a column or another of the three gate panels. For example, the first gate panel and second gate panels could be unlocked, such that the first gate panel pivots about a column and the second gate panel pivots about the third gate panel.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of installing a safety gate, comprising:
- affixing a first column to a first wall and a floor, wherein the first column is disposed on a first side of an elevator shaft;
- affixing a second column to a second wall and the floor, wherein the second column is disposed on a second side of the elevator shaft;
- coupling a first gate panel to the first column via a first locking hinge;
- coupling a second gate panel to the second column via a second locking hinge;
- disposing a first column insert within apertures at the first column;
- disposing a second column insert within apertures at the second column;
- coupling a support rod to each of the first column insert and the second column insert; and
- uncoupling the first gate panel from the first column, such that the first gate panel is pivotable about the second gate panel.

2. The method of claim 1, further comprising disposing a gate latch along a portion of the first gate panel and along a portion of the second gate panel, wherein the gate latch has a U-shaped cross section.

3. The method of claim 1, further comprising pivoting a kick plate from a first position disposed entirely along the first gate panel to a second position, such that the kick plate is coupled to the second gate panel.

4. The method of claim 1, wherein the first column includes a steel frame construction.

5. The method of claim 1, wherein the second column includes a steel frame construction.

6. A method of installing a safety gate, comprising:
- affixing a first column to a first side of an elevator shaft;
- affixing a second column to a second side of the elevator shaft;
- coupling a first rectangular gate panel to the first column;
- coupling a second rectangular gate panel to the second column; and
- coupling the first rectangular gate panel to the second rectangular gate panel via a central lock insert, wherein the central lock insert is U-shaped and includes a first protrusion and a second protrusion, wherein the first protrusion and the second protrusion are parallel, and wherein the first protrusion includes a first proximal portion having a square cross-section and a first distal portion having a circular cross-section and wherein the second protrusion includes a second proximal portion having a square cross-section and a second distal portion having a circular cross-section;

wherein the first protrusion engages with a flange of the first rectangular gate panel, and wherein the second protrusion engages with a flange of the second rectangular gate panel, such that the first protrusion and the second protrusion are disposed vertically between the first rectangular gate panel and the second rectangular gate panel;

wherein the first rectangular gate panel is coupled to the first column via a first locking hinge, and wherein the second rectangular gate panel is coupled to the second column via a second locking hinge.

7. The method of claim 6, wherein the first column is configured to be coupled to one of a wall and a floor, and wherein the second column is configured to be coupled to one of a wall and a floor.

8. The method of claim 6, further comprising disposing a gate latch along a portion of the first rectangular gate panel and along a portion of the second rectangular gate panel, wherein the gate latch has a U-shaped cross section.

9. The method of claim 6, further comprising coupling a kick plate pivotably to the first rectangular gate panel.

10. The method of claim 9, wherein the kick plate is configured to pivot from a first position disposed entirely along the first rectangular gate panel to a second position, such that the kick plate is coupled to the second rectangular gate panel.

11. The method of claim 6, further comprising disposing a toe board plug between the first rectangular gate panel and the second rectangular gate panel, wherein the toe board plug is configured to receive proximal portions of a central lock insert.

12. The method of claim 6, wherein the first column includes a first column insert, disposed within apertures at the first column, wherein the second column includes a second column insert, disposed within apertures at the second column, and wherein each of the first column insert and the second column insert extend vertically from a top of the respective first column and second column.

13. The method of claim 12, wherein a support rod is coupled to each of the first column insert and the second column insert.

14. The method of claim 12, wherein a cable is coupled to each of the first column insert and the second column insert.

15. The method of claim 6, wherein the first column includes a steel frame construction.

16. The method of claim 6, wherein the second column includes a steel frame construction.

* * * * *